Figure 1:
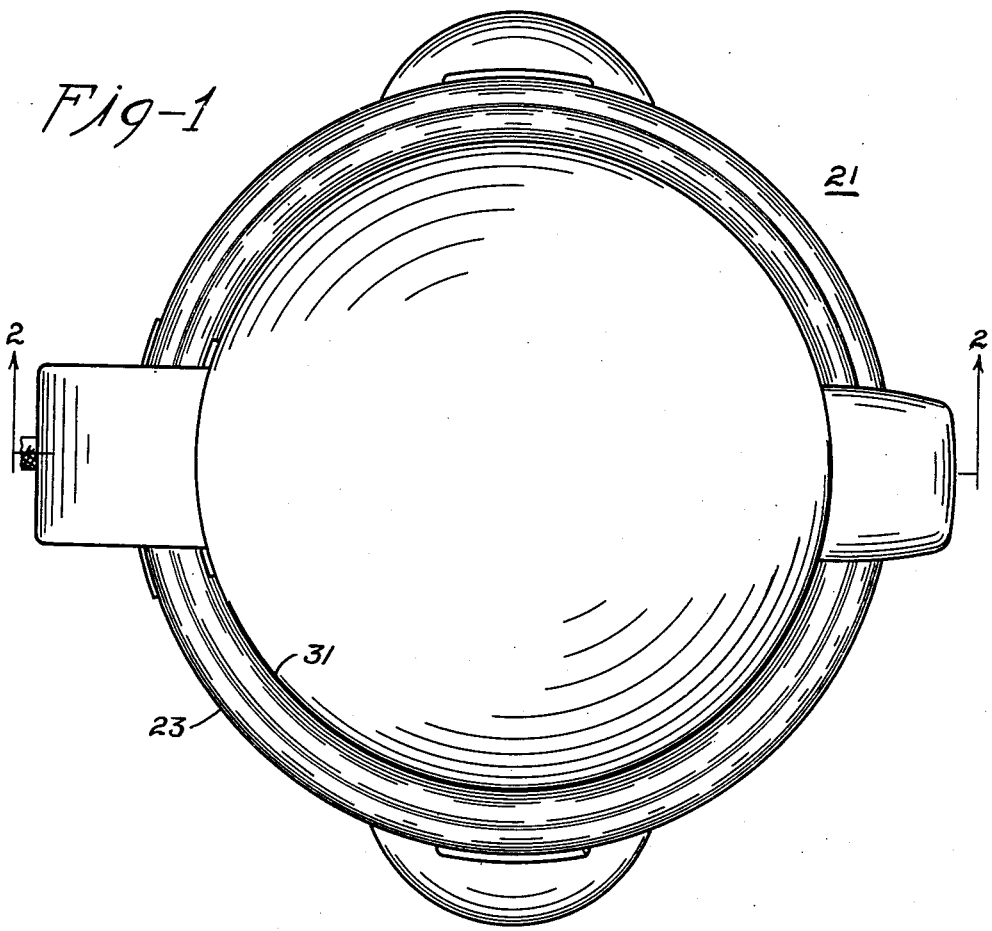

April 1, 1941. L. E. ASKE 2,237,094
WAFFLE BAKER
Filed Feb. 2, 1940 3 Sheets-Sheet 1

INVENTOR
LEONARD E. ASKE
BY
ATTORNEY

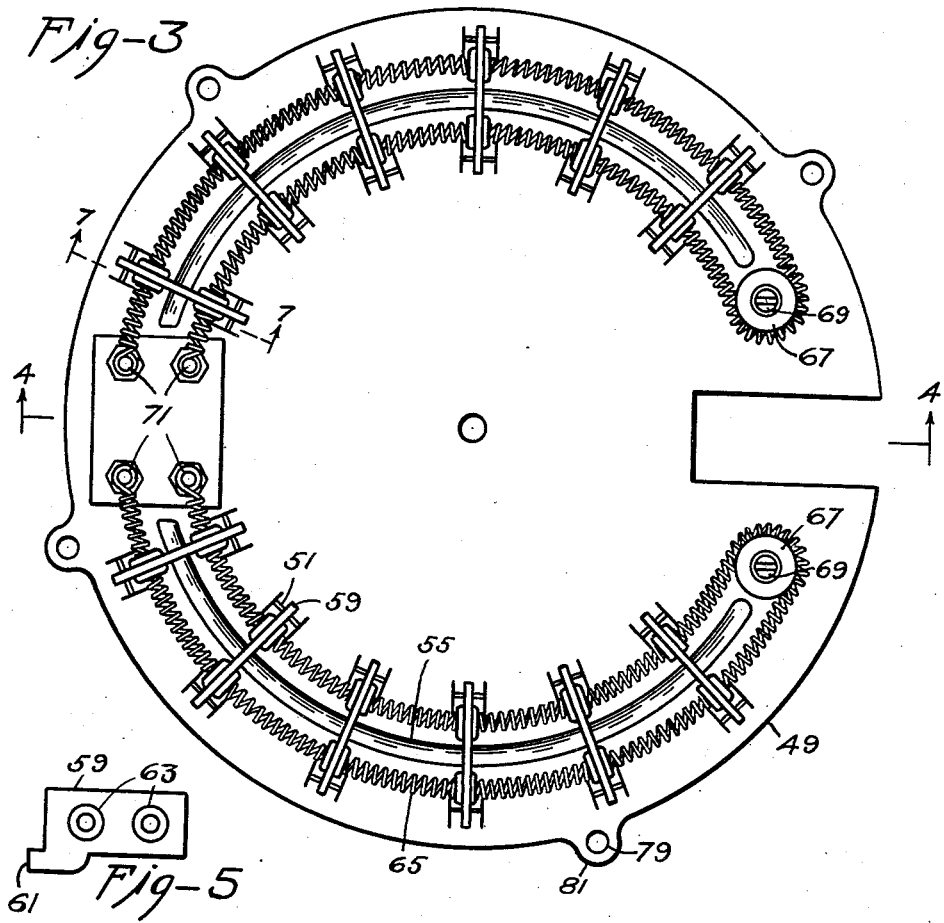
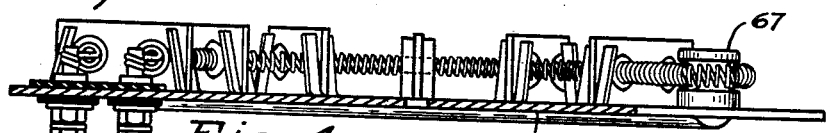
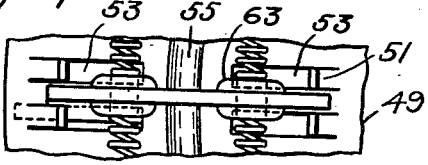
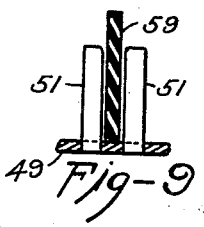
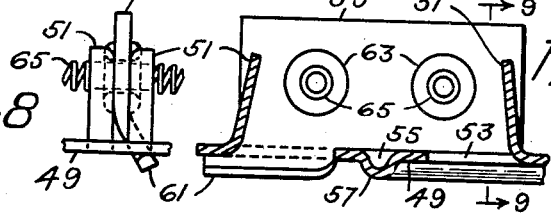

April 1, 1941.   L. E. ASKE   2,237,094
WAFFLE BAKER
Filed Feb. 2, 1940   3 Sheets-Sheet 3

INVENTOR
LEONARD E. ASKE
BY
ATTORNEY

Patented Apr. 1, 1941

2,237,094

UNITED STATES PATENT OFFICE 2,237,094

WAFFLE BAKER

Leonard E. Aske, Elgin, Ill., assignor to McGraw Electric Company, Elgin, Ill., a corporation of Delaware Application February 2, 1940, Serial No. 316,923

2 Claims. (Cl. 219—19)

My invention relates to waffle bakers and particularly to electric heating units therefor.

An object of my invention is to provide a relatively simple, inexpensive and highly efficient electric heating unit for an electrically heated waffle baker.

Another object of my invention is to provide a waffle baker grid having integral means thereon to receive heat from a resistor and to conduct this heat to the grid to cause substantially uniform heating of the entire surface of the grid.

Another object of my invention is to provide an electric heating unit for mounting on a waffle baker grid, that shall have a minimum amount of the resistor covered by the means supporting the resistor.

Figure 2:
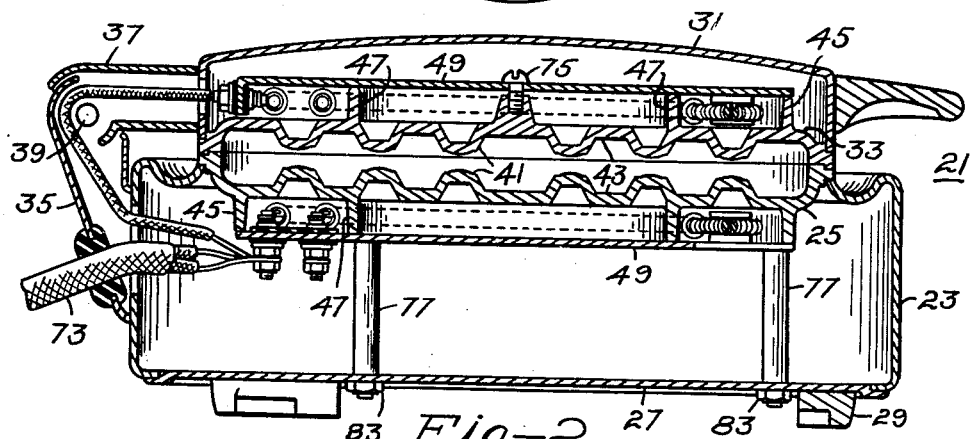

In the drawings,

Figure 1 is a top plan view of a waffle baker having associated therewith my invention, Fig. 2 is a vertical sectional view therethrough taken on the line 2—2 of Fig. 1, Fig. 3 is a plan view of one of the electric heating units showing it mounted on its supporting means, Fig. 4 is a sectional view taken on the line 4—4 of Fig. 3.

Figure 10:
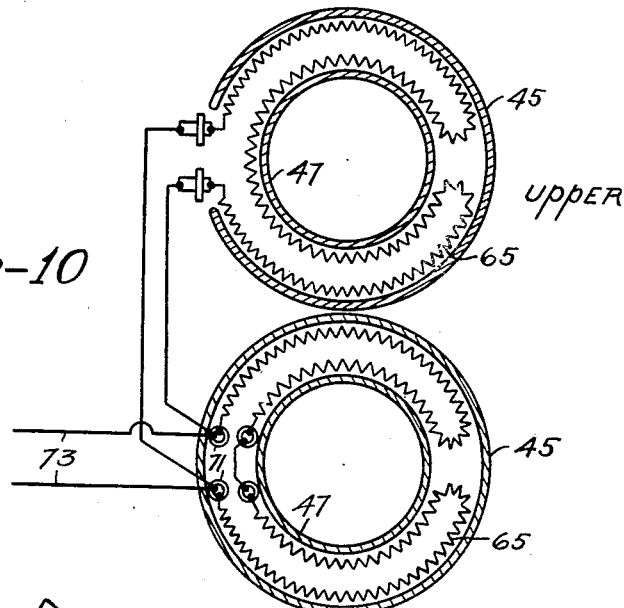
Figure 11:
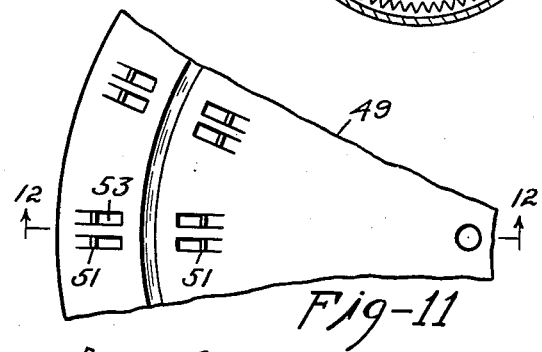
Figure 12:
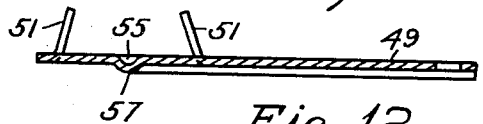
Figure 13:
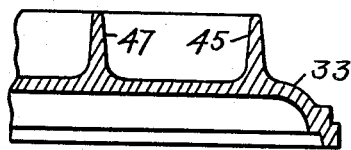

Fig. 5 is a view in front elevation of an insulating plate for supporting the heating coils on the disk, Fig. 6 is a fragmentary plan view, on an enlarged scale, showing the insulating plate of Fig. 5 mounted on its supporting means, Fig. 7 is a fragmentary sectional view on an enlarged scale, taken on the line 7—7 of Fig. 3, Fig. 8 is an end elevational view of the parts shown in Fig. 7, Fig. 9 is a sectional view taken on the line 9—9 of Fig. 7, Fig. 10 is a diagram showing the electrical connections for the upper and the lower heating units in a waffle baker, Fig. 11 is a fragmentary plan view of a resistor supporting disk, Fig. 12 is a sectional view taken on the line 12—12 of Fig. 11, and, Fig. 13 is a fragmentary sectional view through a grid showing more particularly the lateral ribs on the back of a grid.

One of the important details to be considered in the design of an electrically heated waffle baker is that of the form, construction and location of the electric heating unit, one of each of which is mounted on or adjacent to the back of the respective grids. As is well known, the greatest amount of heat is radiated from a grid at the outer peripheral edge thereof and the hottest spot on a grid is substantially at the center of a circular grid. A number of different forms of heating elements have been designed and attention may be called to flat annular heating units in which a resistor conductor is wound around an intermediate annular-shaped strip of mica which is then clamped against the back surface of the grid, covering plates of mica being provided, as is well known in the art. My invention provides a preferably bare resistor wire wound into coil shape and I further preferably use two such coiled resistors positioned between annularly-extending ribs integral with the back of a grid. The bare resistor wire or conductor is suitably spaced from the grid and from the inside walls of the radially-spaced ribs by very thin electric-insulating supports, so that the heating element is surrounded on three of its sides by effective heat-receiving members conducting heat to the back surface of the grid.

I have illustrated a waffle baker 21 which includes a lower casing 23 having mounted thereon a lower grid 25. A bottom closure plate 27 may be provided for the lower casing 23 and suitable supports 29 of heat-insulating material may be provided to suitably support the waffle baker on a supporting surface or table. The baker includes further an upper casing 31 having an upper grid 33 mounted therein, a hinge means for permitting relative movement of the upper and the lower grids being constituted by a bottom hinge member 35 and an upper hinge member 37 secured respectively to the lower and the upper casing, in combination with a hinge pin 39. These details are shown only in order to illustrate and describe a complete waffle baker assembly operative for its desired purpose. It is to be further understood that the opposing or baking surfaces of the upper and the lower grids are provided with the usual projections 41 and recesses 43 commonly used in waffle baker grids.

Each of the grids is provided with an outer annular rib 45 and an inner annular rib 47 preferably made integral with the rear surface of a grid and reference to Fig. 13 of the drawings will show that I prefer to make the ribs 45 and 47 of varying thickness, tapering from a relatively large thickness adjacent the grid to a smaller thickness at their outer edges or ends. Reference to Fig. 10 of the drawings will show that the inner rib 47 is substantially continuous in both the upper and the lower grids while the outer annular rib 45 is dis-continuous at one point on the upper circular grid and is continuous peripherally in the lower grid.

An electric heating unit assembly is shown in plan view in Fig. 3 of the drawings and includes a thin metal plate 49 which constitutes the plate to be operatively associated with the lower grid. A plurality of pairs of integral bent-out ears 51 are provided there being two substantially annular rows of such pairs of bent-out ears, each of which, of course, leaves an aperture 53 in disk 49. The two annular rows of bent-out ears 51 are spaced apart radially of each other and in order to obtain somewhat greater strength of the disk 49, I may provide a groove 55 in one surface causing a bulged-out portion 57 on the opposite surface of the disk 49. It will be noted that the ears 51 are spaced apart peripherally only a short distance just sufficient to receive therebetween a small plate 59 of mica. Each of these pieces of mica is of substantially rectangular form as will be seen by reference to Fig. 5 of the drawings, but each plate has a short extension 61 at one corner, which extension 61 extends beyond the true rectangular shape of the plate both laterally and longitudinally for a purpose that will hereinafter appear. While I illustrated a specific number of such pairs of bent-out ears in Fig. 3 of the drawings, it is to be understood that I do not desire to be limited to the actual number there shown since the pairs of ears 51 may be spaced further apart peripherally or closer together peripherally of the disk 49 if desired.

Each of the plates 59 of mica is provided with metal eyelets or grommets 63 spaced apart a suitable distance longitudinally of the plate and a coiled resistor conductor 65 extends through the eyelet 63 to be supported thereby, it being noted that the plates 59 of mica interfit with and extend substantially radially of the disk 49 and extend at substantially a right angle from the surface of the disk whereby the amount of resistor conductor covered by its support is relatively small and a relatively large percentage of the normally bare resistance conductor may radiate heat to the surrounding metal surfaces as will be hereinafter more clearly pointed out.

Reference to Figs. 6 to 9 inclusive will show the method of mounting the respective plates of mica 59 in-between the pairs of spaced ears 51 with the extension 61 extending into one of the apertures 53 left in the disk 49 by one of the bent or punched-out ears 51. Reference to Fig. 8 of the drawings will illustrate schematically at least, the bending which occurs in the mica plate 59 and particularly in the extension 61 thereon. This bending will be effective to hold the main body of the plate 59 in-between the two pairs of bent-out ears 51 and the interfit of the extension 61 with the disk 49 will hold the plate 59 in substantially fixed position relatively to the supporting disk 49.

It may be noted that there is only a slight difference in the general shape of the heating elements associated with the upper and with the lower grid respectively in that the inner strand of coiled resistor in the upper heating unit is not interrupted at the point where the outer strand is interrupted and that therefore the resistor conductor consists of a single length of wire or strip of resistor material. In the lower heating unit I use two double-strand heating unit portions, this construction being shown particularly in Fig. 3 of the drawings. The mid point or part of each of the two heating unit portions extends around a substantially circular member 67 of electric-insulating material suitably clamped against one surface of the disk 49 as by a screw 69. The other ends of each of the resistors may be engaged with terminal members 71, conductors being provided between the upper and the lower heating units to connect them in the desired electrical relation relatively to each other and a twin conductor cord 73 may be provided to permit of suitably energizing the upper and the lower heating units when the cord 73 is connected to a source of supply of electric energy.

As shown for instance in Fig. 10 of the drawings, the twin strand heating resistor is positioned between the inner and the outer annularly-extending ribs 47 and 45 and it may be pointed out that the width of each of the mica plates 59 is such that when the heating unit is associated with the outer or back surfaces of the respective grids, the outer edge of each mica plate 59 will be in engagement with the back surface of a grid between the ribs 45 and 47, all as shown in Fig. 2 of the drawings. The upper disk 49 may be clamped in its proper operative position relatively to the grid 33 by a single central screw 75 while the lower disk 49 may be clamped against the outer edges of the ribs 45 and 47 by means of screw-threaded ends of rods 77, the screw-threaded ends of these rods extending through openings 79 in lugs 81 formed at the outer edge of these rods extending through openings 79 in lugs 81 formed at the outer edge of disk 49.

The outer ends of the rods 77 may be reduced in diameter, and have screw threads provided thereon to receive clamping nuts 83 effective to hold the bottom closure plate 27 against the bottom of the casing 23.

I may point out that the position of the spaced annular ribs 45 and 47 radially of a grid is made such that when the twin strand resistor conductor is positioned therebetween and energized, a substantially uniform heating of the baking surface of the grid is effected, resulting in uniform baking or browning of batter which is poured upon the lower grid in a manner well known in the art.

It may be further pointed out that the heating unit which, as hereinbefore noted, is preferably made of a bare resistor conductor, is surrounded on three of its sides by the grid or positions integral with the grid whereby a relatively highly efficient form of heating unit and transfer of heat therefrom to the grid is obtained. It is further within the purview of my invention to so design the parts of each heating unit that it is possible to cause heat-conducting engagement of a metal disk 49 with the outer edges of the ribs 45 and 47 to thereby further provide relatively highly efficient heat-transfer means for heat reaching the resistor-supporting disks. Tests on a structure of the kind shown in the drawings and embodying the heating unit illustrated therein have shown that it is possible to obtain substantially uniform baking of batter poured in the waffle baker and I attribute this uniform baking to the structure hereinbefore described and including particularly the spaced annular ribs and the bare resistor which is so supported that a minimum portion thereof is covered by the supporting means leaving all but a very small portion of the resistor effective to radiate heat to the grid.

Various modifications may be made in the device embodying my invention without departing from the spirit and scope and I desire therefore that all obvious modifications coming within the scope of the claims shall be considered as being covered thereby.

I claim as my invention:

1. A waffle baker including a circular grid, a circularly-extending bare heating coil, a plurality of radially-extending thin mica plates, a pair of radially-spaced circularly-extending ribs integral with the grid, at the back surface thereof and constituting with the grid heat-receiving walls at three sides of the heating coil, a thin metal disk having pairs of integral bent-out ears to receive the several mica plates and locate them between the ribs, an edge portion of each mica plate extending through one of the apertures left in the disk by one of the bent-out ears and overlapping the disk and means for holding the metal disk against the outside edges of the ribs and an edge of the mica plates against the rear surface of the grid.

2. A waffle baker including a circular grid having two radially-spaced annular ribs integral therewith at the back surface of the grid, an annularly-extending bare heating coil between said ribs, a plurality of peripherally spaced radially-extending thin mica plates for receiving and supporting the heating coil, a thin metal disk having two concentric annular rows of peripherally spaced pairs of closely-adjacent bent-out ears, the pairs of ears in the two rows being radially alined with each other to receive end portions of each mica plate, said mica plates each having a corner extension thereon to overlappingly interfit with said metal disk at one of the apertures left in the disk by one of the bent-out ears and means for holding the metal disk against the outside edges of the ribs and an edge of the mica plates against the rear surfaces of the grid.

LEONARD E. ASKE.